B. BISCHOF.
DEVICE FOR PREVENTING THE PENETRATION OF AIR INTO CENTRIFUGAL PUMPS.
APPLICATION FILED MAY 7, 1921.
1,421,389.                                                     Patented July 4, 1922.
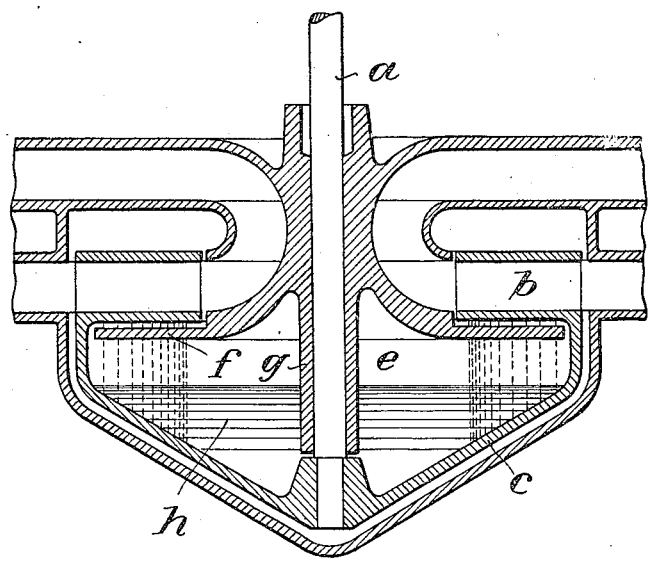
Inventor
BERNHARD BISCHOF
by
Attorney.

UNITED STATES PATENT OFFICE.

BERNHARD BISCHOF, OF GENEVA, SWITZERLAND.

DEVICE FOR PREVENTING THE PENETRATION OF AIR INTO CENTRIFUGAL PUMPS.

1,421,389. Specification of Letters Patent. Patented July 4, 1922.

Application filed May 7, 1921. Serial No. 467,535.

*To all whom it may concern:*

Be it known that I, BERNHARD BISCHOF, a citizen of Switzerland, residing at Geneva, Switzerland, have invented certain new and useful Improvements in a Device for Preventing the Penetration of Air into Centrifugal Pumps, of which the following is a specification.

It is known that rotating shafts can be packed against small pressures by means of centrifugal packings. Arrangements of this nature have the one drawback that the packing becomes inactive, as soon as the rotation of the shaft ceases.

A second disadvantage of these packings consists in the fact that the sealing-liquid is in direct contact on the one hand with the outer air and, on the other hand, with the gases or liquids to be packed or hermetically shut off, and also that when the engine is at a standstill mixtures can take place which are adapted to cause chemical decompositions.

These drawbacks are prevented by the device described below. This consists substantially of a rotating hollow chamber, in which a stationary wall is so placed that the packing liquid remains in the hollow chamber and exerts a packing or sealing action whether the pump be at rest or in operation.

Such a device is shown diagrammatically by way of example in axial section in the accompanying drawing.

Upon the rotating shaft $a$ there is fastened a centrifugal wheel $b$ by means of a dished carrier plate $c$. The carrier plate and the centrifugal wheel form the hollow chamber or space $e$ into which a disc $f$ projects. The disc $f$ is secured fast upon the journal $g$. The chamber $e$ is partly filled with a liquid $h$.

The method of operation is as follows:

By the rotation of the shaft $a$, the carrier plate $c$ and the centrifugal wheel $b$, the liquid contained in the hollow chamber $e$, which normally takes up the position shown in full lines, is hurled outwards and forms a liquid ring as indicated in dotted lines into which the stationary disc $f$ projects. This liquid ring prevents the entrance of air, which could flow through the journal $g$ downwards into the suction canal. Owing to the fact that the hollow space $e$ on the one hand is formed by the centrifugal wheel $b$ itself and, on the other hand by the carrier plate $c$, the liquid ring only requires to pack off or shut off the suction pressure. If the shaft stands still then the liquid forming the ring of liquid falls downwards and surrounds the journal $g$ so that, with a suitably selected liquid, a sufficiently high column of liquid is formed which has a "packing" action. The liquid in the hollow chamber $e$ is always the same, so that prejudicial influences of the air upon the means to be compressed are restricted to the liquid shut off in the hollow chamber $e$.

What I claim is:

1. In a device for preventing the penetration of air into centrifugal pumps, a centrifugal wheel, a carrier plate for said centrifugal wheel, a stationary disc, a hollow chamber formed by said carrier plate and said stationary disc, a sealing liquid arranged in said chamber.

2. In a device for preventing the penetration of air into centrifugal pumps, a centrifugal wheel, a dished carrier plate for said centrifugal wheel, a stationary disc, a hollow chamber formed by said carrier plate and said stationary disc, a sealing liquid arranged in said chamber.

3. In a device for preventing the penetration of air into centrifugal pumps, a centrifugal wheel, a dished carrier plate for said centrifugal wheel, a stationary disc with a plane surface near the rim, a hollow chamber formed by said carrier plate and said stationary disc, a sealing liquid arranged in said chamber.

4. In a device for preventing the penetration of air into centrifugal pumps a centrifugal wheel, a dished carrier plate for said centrifugal wheel, a stationary disc with a plane surface near the rim, the upper side of said plane surface being opposed in a small distance to the under side of said centrifugal wheel, a hollow chamber formed by said dished carrier plate and said stationary disc, a sealing liquid arranged in said chamber.

In testimony whereof I have hereunto set my hand.

BERNHARD BISCHOF.